United States Patent
Krebs et al.

(10) Patent No.: US 6,648,291 B2
(45) Date of Patent: Nov. 18, 2003

(54) LONGITUDINAL ADJUSTING DEVICE FOR A VEHICLE SEAT

(75) Inventors: Jürgen Krebs, Rockenhausen (DE); Peter Strubel, Flonheim (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 2 days.

(21) Appl. No.: 10/230,776

(22) Filed: Aug. 29, 2002

(65) Prior Publication Data

US 2003/0042386 A1 Mar. 6, 2003

(30) Foreign Application Priority Data

Sep. 1, 2001 (DE) .......................... 101 42 994

(51) Int. Cl.[7] .............................................. F16M 13/00
(52) U.S. Cl. ...................................................... 248/429
(58) Field of Search ................................ 248/423, 424, 248/429, 430; 297/471, 341, 344.1

(56) References Cited

U.S. PATENT DOCUMENTS

| 4,556,263 A | 12/1985 | Chevalier |
| 4,711,589 A * | 12/1987 | Goodbred .................. 384/34 |
| 5,407,166 A | 4/1995 | Pilarski |
| 5,813,648 A * | 9/1998 | Moradell et al. ........... 248/424 |
| 6,364,272 B1 | 4/2002 | Schuler et al. |

FOREIGN PATENT DOCUMENTS

| DE | 198 04 506 A1 | 8/1999 |
| DE | 199 22 294 A1 | 11/2000 |
| EP | 0 090 701 A1 | 10/1983 |
| EP | 1 052 139 A2 * | 11/2000 |

* cited by examiner

Primary Examiner—Ramon O. Ramirez
(74) Attorney, Agent, or Firm—Alston & Bird LLP

(57) ABSTRACT

In a longitudinal adjusting device for a vehicle seat, in particular for a motor vehicle seat, having a first seat rail (5), a second seat rail (8) which can be displaced relative to the first seat rail (5) in the longitudinal direction, and a mounting part (12) which is arranged on the second seat rail (8), the first seat rail (5) on the one hand and the second seat rail (12) with the mounting part (12) on the other engaging alternately one around the other, a roof-shaped element (24) which limits, as a stop, the displacement in the longitudinal direction is formed on the mounting part (12).

20 Claims, 2 Drawing Sheets

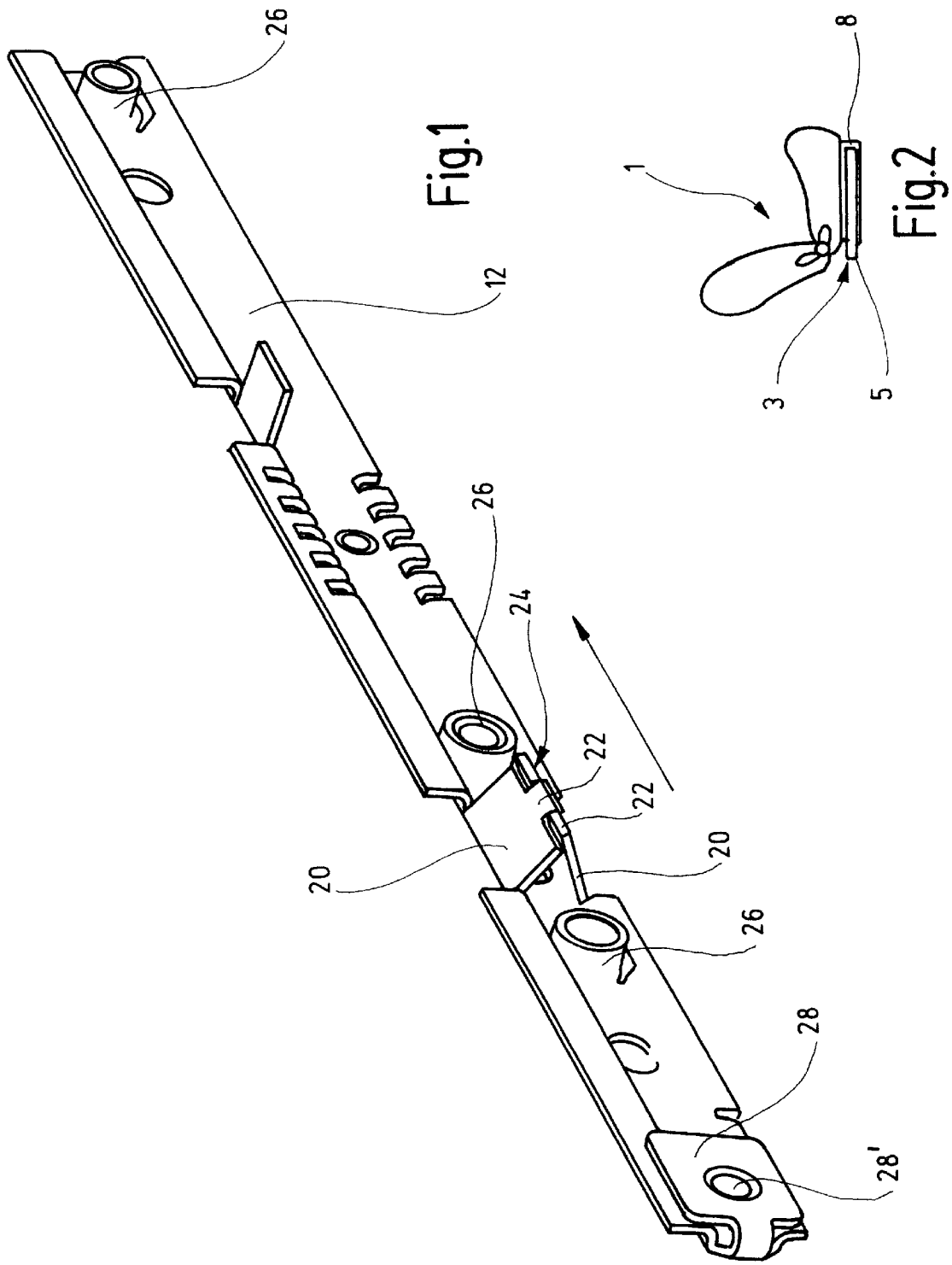

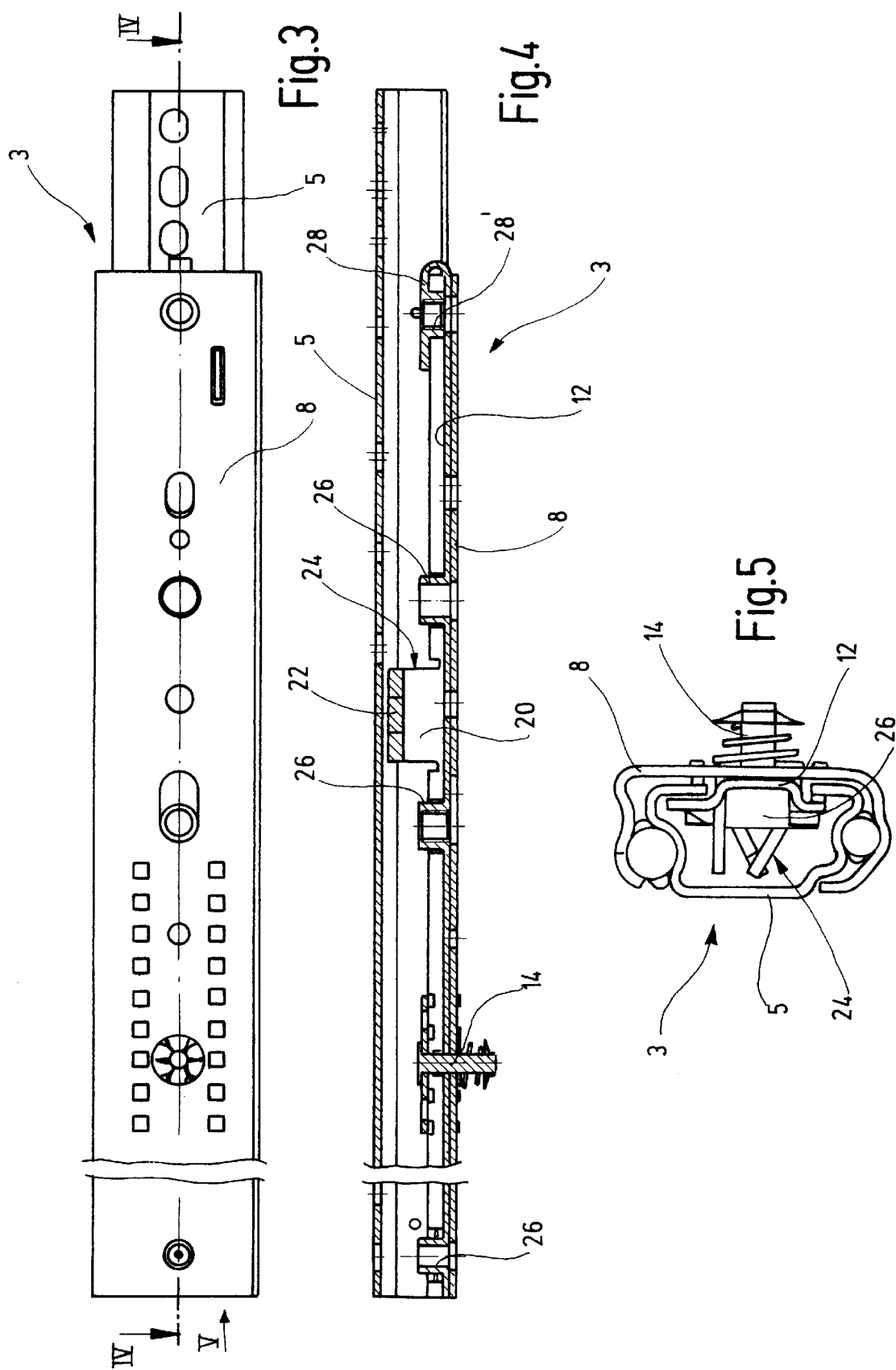

LONGITUDINAL ADJUSTING DEVICE FOR A VEHICLE SEAT

BACKGROUND OF THE INVENTION

The present invention relates to a longitudinal adjusting device for a vehicle seat, in particular for a motor vehicle seat.

DE 199 22 294 A1 discloses a known longitudinal adjusting device in which a first seat rail is attached laterally to the vehicle structure for supporting and guiding a second seat rail which is attached laterally to the vehicle seat. The second seat rail has a mounting part with which it engages around the first seat rail in order to prevent tearing off in the event of a crash. The mounting part acts simultaneously as a reinforcement of the second seat rail.

BRIEF SUMMARY OF THE INVENTION

One aspect of the present invention is the provision of an improved longitudinal adjusting device.

In accordance with one aspect of the present invention, a longitudinal adjusting device for a vehicle seat, in particular for a motor vehicle seat, has a first seat rail, a second seat rail, which can be displaced in the longitudinal direction relative to the first seat rail, and a mounting part, which is arranged on the second seat rail. In accordance with this aspect, the first seat rail, on the one hand, and the second seat rail with the mounting part, on the other hand, are engaging alternately one around the other. Further in accordance with this aspect, a roof-shaped element (e.g., an at least generally V-shaped element) is formed on the mounting part and limits, as a stop, the displacement in the longitudinal direction.

By virtue of the fact that a roof-shaped element which limits, as a stop, the displacement in the longitudinal direction is formed on the mounting part, the mounting part is given, apart from its mounting and reinforcement function, also the function of a stop, without additional components being necessary. The roof-shaped construction reinforces the roof-shaped element which acts as a stop, and forms at the same time a relatively large stop surface.

The preferred single-piece construction of the roof-shaped element from clips of the mounting part keeps the number of components to be mounted, and thus the expenditure on mounting, low. The stamping of the clips, i.e. the shaping of the clips and engagement of cut-out teeth between one another increases the rigidity in the longitudinal direction of the seat rails and ensures a low positioning tolerance, in particular in the case of teeth which engage in one another in a positively locking fashion owing to their rectangular design. The attachment points of the mounting part, for example in the form of projections, are preferably provided in the direct vicinity of the roof-shaped element in view of the reinforcing effect and stop effect of the roof-shaped element.

Further elements can be formed from the mounting part, for example integrally formed-on attachment clips in at least one end region, which preferably increase the thickness of the mounting part by being bent over. The two seat rails are preferably locked to one another by means of a locking device which is mounted in the mounting part. Using the laterally attached seat rails the vehicle seat is positioned lower, which is advantageous, in particular, in sporty vehicles.

BRIEF DESCRIPTION OF THE SEVERAL VIEWS OF THE DRAWINGS

The invention will be explained in more detail below with reference to an exemplary embodiment which is illustrated in the drawings, in which:

FIG. 1 shows a perspective view of a mounting part of the exemplary embodiment, the direction of travel being indicated by an arrow, FIG. 2 shows a side view of a vehicle seat which is equipped according to the invention, FIG. 3 shows a view of the side of the exemplary embodiment facing the vehicle seat, FIG. 4 shows a section along the line IV—IV in FIG. 3, and FIG. 5 shows an end view in the direction of the arrow V in FIG. 3.

DETAILED DESCRIPTION OF THE INVENTION

The present invention now will be described more fully hereinafter with reference to the accompanying drawings, in which one or more, but not all embodiments of the invention are shown. Indeed, the invention may be embodied in many different forms and should not be construed as limited to the embodiment(s) set forth herein; rather, one or more embodiments are provided so that this disclosure will satisfy applicable legal requirements.

A device for longitudinally adjusting a vehicle seat 1 is referred to below as longitudinal adjusting device 3. The usual orientation of the vehicle seat 1 in a motor vehicle and its normal direction of travel define the following directional data. The longitudinal adjusting device 3 has, on each side of the vehicle seat 1, a lower rail 5 which is fixed to the vehicle structure as a first seat rail and which is attached laterally to the sill or to the tunnel. Each of the approximately C-shaped lower rails 5 has an also approximately C-shaped upper rail 8 engaging around it from the outside as a second seat rail. Each upper rail 8 is guided in a sliding fashion on the assigned lower rail 5 with the intermediate positioning of ball bearings. The upper rail 8 is fixed to the seat structure by being connected laterally, on the side facing away from the lower rail 5, to parts (not illustrated in detail) of the substructure of the vehicle seat 1.

The lower rail 5 and the upper rail 8 form a rail profile which defines an installation space. A mounting part 12 is provided within this installation space. The mounting part 12 is arranged on the inside of the upper rail 8 along its wall which extends edgewise, and is permanently connected to the substructure of the vehicle seat 1 using attachment means which are common to the upper rail 8. The lower rail 5 on the one hand, and the upper rail 8 with the mounting part 12 on the other hand, are shaped in their edge regions running in the longitudinal direction in such a way that they mount one into the other alternately through repeated engagement. In the event of a crash, the forces which occur are directed into the vehicle structure via the mounting regions without the risk of the rails breaking away.

A locking device 14 is arranged approximately in the center of the mounting part 12. One mounting of the locking device 14 is mounted by means of a bolt in a drilled hole in the mounting part 12 and in the upper rail 8, and it is prestressed by a compression spring on the outside of the upper rail 8, the mounting engaging by means of a plurality of fingers through latches in the lower rail 5, openings and/or cut-outs in the mounting part 12 and openings in the upper rail 8.

Between the locking device 14 and the rear end of the mounting part 12, in each case a clip 20 is punched out of the edge region of the mounting part 12 in the shape of a tongue from above and from below in the installation position and is laterally deflected at an obtuse angle by bending over. The two clips 20 therefore originate from two opposite longitudinal edge regions of the mounting part 12. A toothing 22 with rectangular teeth is cut into the free edge on each clip 20. The two clips 20 engage in one another with the toothings 22 and form a closed shape with triangular cross section, referred to below as a roof-shaped element 24 (e.g., an at least generally V-shaped element). Owing to the toothings 22 which engage in one another, the clips 20 have a fixed orientation with one another both in terms of angle with respect to one another and in the longitudinal direction. The roof-shaped element 24 projects into the installation space of the rail profile and has a high degree of strength with low positioning tolerance. The roof-shaped element 24 interacts, as an end stop for the movement of the upper rail 8 in its rearmost position, with a stop which is attached in the end region of the lower rail 5.

Formed in front of and behind the roof-shaped element 24 in its direct vicinity are two projections 26 in the mounting part 12, i.e. each is formed as a hollow, laterally protruding tube by the expulsion of material of the mounting part 12. The projections 26 which are provided with an internal thread are used, as is a further projection 26 of identical construction at the front end of the mounting part 12, to attach the mounting part 12 and the upper rail 8 to the rest of the substructure of the vehicle seat 1. An attachment clip 28 which has a short projection 28' with an internal thread is integrally formed onto the rear end of the mounting part 12 by means of a material bridge which is narrower than the rest of the width of the mounting part 12. The attachment clip 28 is bent toward the inside and serves as a reinforced attachment point of the mounting part 12.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiment(s) disclosed and that modifications and other embodiments are intended to be included within the scope of the appended claims. Although specific terms are employed herein, they are used in a generic and descriptive sense only and not for purposes of limitation.

That which is claimed:

1. A longitudinal adjusting device for a vehicle seat, the longitudinal adjusting device comprising:
   first and second seat rails extending in a longitudinal direction and movably mounted to one another by way of at least one of the first and second seat rails engaging at least partially around the other of the seat rails, so that the second seat rail can be moved in the longitudinal direction relative to the first seat rail; and
   a mounting part arranged on the second seat rail, wherein the mounting part is for use in mounting the second seat rail to the vehicle seat, and wherein an at least generally V-shaped stop is formed on the mounting part for restricting longitudinal movement of the second seat rail relative to the first seat rail.

2. The longitudinal adjusting device as claimed in claim 1, wherein the stop is formed from two clips of the mounting part which are deflected from the mounting part.

3. The longitudinal adjusting device as claimed in claim 2, wherein the clips extend toward one another in a convergent manner.

4. The longitudinal adjusting device as claimed in claim 2, wherein the mounting part includes an attachment clip that is positioned at one end of the mounting part, the mounting part includes a material bridge connecting the attachment clip to a remainder of the mounting part, and the material bridge has a narrower width than the remainder of the mounting part.

5. The longitudinal adjusting device as claimed in claim 2, wherein the clips are formed from longitudinal edge regions of the mounting part, with the longitudinal edge regions being opposite from one another.

6. The longitudinal adjusting device as claimed in claim 2, wherein each of the clips includes toothing, and the toothing of one of the clips is aligned with the toothing of another of the clips.

7. The longitudinal adjusting device as claimed in claim 6, wherein the toothings have rectangular teeth with which the toothings engage in one another.

8. The longitudinal adjusting device as claimed in claim 6, wherein the mounting part includes an attachment clip that is positioned at one end of the mounting part, the mounting part includes a material bridge connecting the attachment clip to a remainder of the mounting part, and the material bridge has a narrower width than the remainder of the mounting part, and wherein the attachment clip is bent over in relation to a reference portion of the mounting part, the attachment clip bears on the reference portion of mounting part, and the attachment clip has a means for attaching the mounting part.

9. The longitudinal adjusting device as claimed in claim 3, wherein at least one tooth of one of the clips engages teeth of the other of the clips.

10. The longitudinal adjusting device as claimed in claim 5, wherein a plurality of projections for attaching the mounting part are formed on the mounting part and are in close proximity to the stop.

11. The longitudinal adjusting device as claimed in claim 5, wherein the first seat rail can be attached laterally to structure of a vehicle, and the second seat rail can be attached laterally to structure of the vehicle seat.

12. The longitudinal adjusting device as claimed in claim 5, wherein the longitudinal adjuster is in combination with the vehicle seat, and the second seat rail is attached to structure of the vehicle seat.

13. The longitudinal adjusting device as claimed in claim 1, wherein the mounting part includes an attachment clip that is positioned at one end of the mounting part, the mounting part includes a material bridge connecting the attachment clip to a reminder of the mounting part, and the material bridge has a narrower width than the remainder of the mounting part.

14. The longitudinal adjusting device as claimed in claim 13, wherein the attachment clip is bent over in relation to a reference portion of the mounting part, the attachment clip bears on the reference portion of mounting part, and the attachment clip has a means for attaching the mounting part.

15. The longitudinal adjusting device as claimed in claim 1, wherein projections for attaching the mounting part are formed on the mounting part, with two of the projections being in close proximity to the stop.

16. The longitudinal adjusting device as claimed in claim 1, wherein the first seat rail can be attached laterally to structure of a vehicle, and the second seat rail can be attached laterally to structure of the vehicle seat.

17. The longitudinal adjusting device as claimed in claim 1, wherein the longitudinal adjusting device is in combination with the vehicle seat, and the second seat rail is attached to structure of the vehicle seat.

18. A longitudinal adjusting device for a vehicle seat, the longitudinal adjusting device comprising:

first and second seat rails extending in a longitudinal direction and movably mounted to one another by way of at least one of the first and second seat rails engaging at least partially around the other of the seat rails, so that the second seat rail can be moved in the longitudinal direction relative to the first seat rail; and a mounting part arranged on the second seat rail, wherein the mounting part is for use in mounting the second seat rail to the vehicle seat, and a stop is formed on the mounting part for restricting longitudinal movement of the second seat rail relative to the first seat rail, wherein the stop includes a plurality of protrusions of the mounting part that extend in a direction away from a reference portion of the mounting part, with the protrusions extending convergently with respect to one another in the direction away from the reference portion of the mounting part.

19. The longitudinal adjusting device as claimed in claim 18, wherein the plurality of protrusions at least generally define a V-shape.

20. The longitudinal adjusting device as claimed in claim 18, further comprising a stop connected to the first seat rail, wherein the stop connected to the first seat rail interacts with the stop formed on the mounting part for restricting longitudinal movement of the second seat rail relative to the first seat rail.

* * * * *

UNITED STATES PATENT AND TRADEMARK OFFICE
CERTIFICATE OF CORRECTION

PATENT NO. : 6,648,291 B2  
DATED : November 18, 2003  
INVENTOR(S) : Krebs et al.

It is certified that error appears in the above-identified patent and that said Letters Patent is hereby corrected as shown below:

<u>Column 4,</u>
Lines 27-28, "claim 3" should read -- claim 5 --.

Signed and Sealed this

Seventeenth Day of February, 2004

JON W. DUDAS  
*Acting Director of the United States Patent and Trademark Office*